US008302001B2

(12) United States Patent
Mitsui

(10) Patent No.: US 8,302,001 B2
(45) Date of Patent: Oct. 30, 2012

(54) DOCUMENT ENCRYPTION AND DECRYPTION PRINTING APPARATUS, METHOD, AND STORAGE MEDIUM

(75) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 12/417,526

(22) Filed: Apr. 2, 2009

(65) Prior Publication Data

US 2009/0254810 A1 Oct. 8, 2009

(30) Foreign Application Priority Data

Apr. 3, 2008 (JP) ................................. 2008-097241

(51) Int. Cl.
*G06F 17/00* (2006.01)
*G06F 17/24* (2006.01)
*G06F 21/00* (2006.01)

(52) U.S. Cl. ........ 715/255; 715/234; 715/256; 715/271; 705/51; 705/57

(58) Field of Classification Search .................. 715/234, 715/255, 256, 271; 705/51, 57
See application file for complete search history.

(56) References Cited

U.S. PATENT DOCUMENTS

| | | | | |
|---|---|---|---|---|
| 8,014,560 | B2* | 9/2011 | Nafarieh et al. | 382/100 |
| 2003/0028801 | A1* | 2/2003 | Liberman et al. | 713/200 |
| 2006/0050879 | A1* | 3/2006 | Iizuka | 380/51 |
| 2008/0077806 | A1* | 3/2008 | Cui et al. | 713/193 |
| 2008/0168554 | A1* | 7/2008 | Kim | 726/18 |
| 2008/0174811 | A1* | 7/2008 | Tanaka et al. | 358/1.15 |
| 2008/0292130 | A1* | 11/2008 | Nafarieh et al. | 382/100 |
| 2009/0024854 | A1* | 1/2009 | Fukasawa | 713/189 |

FOREIGN PATENT DOCUMENTS

| | | | |
|---|---|---|---|
| EP | 1077421 A2 * | 2/2001 | |
| JP | 2002-259363 A | 9/2002 | |
| JP | 2007-156861 A | 6/2007 | |
| WO | WO 02084515 A1 * | 10/2002 | |
| WO | WO 02102055 A1 * | 12/2002 | |

OTHER PUBLICATIONS

Microsoft Corporation, Microsoft Computer Dictionary, Microsoft Press, Fifth Edition, p. 527-530, 551.*
Diaconis et al., Dynamical Bias in the Coin Toss, May 1, 2007, Society for Industrial and Applied Mathematics, SIAM Review vol. 49 No. 2, pp. 211-235. Retrieved from http://www-stat.stanford.edu/~cgates/PERSI/papers/dyn_coin_07.pdf.*

* cited by examiner

*Primary Examiner* — Chau Nguyen
(74) *Attorney, Agent, or Firm* — Canon U.S.A., Inc., IP Division

(57) ABSTRACT

An information processing apparatus which processes document information includes a designation unit configured to designate information which is not to be displayed in the document information, a generation unit configured to generate identification information which is uniquely determined, an addition unit configured to add metadata for restoring the designated information from the identification information to the document information, and a replacing unit configured to replace the designated information in the document information with the identification information.

6 Claims, 11 Drawing Sheets

FIG.6

```
<MetaData>
  <GlypyData page="1.fpage">
    <Pseudo Guid="{01961665-FF0D-4365-A3D6-2D84F3FA411E}">
      <Glyphs Fill="#ff000000" FontUri="/Documents/1/Resources/Fonts/B2B837C7-0C40-41F5-B8A2-BB542FF04582.odttf" FontRenderingEmSize="48.0019" StyleSimulations="None" OriginX="192" OriginY="89.28" Indices="17338;17356;17361;17351;17362;17370;17366;17283;17339;17331" UnicodeString="Windows XP" />
    </Pseudo>
  </GlypyData>
</MetaData>
```

FIG.11

STORAGE MEDIUM SUCH AS FD/CD-ROM

| DIRECTORY INFORMATION |
|---|
| PROGRAM CODE CORRESPONDING TO STEPS OF FLOWCHART ILLUSTRATED IN FIG. 5 |
| PROGRAM CODE CORRESPONDING TO STEPS OF FLOWCHART ILLUSTRATED IN FIG. 10 |
| |

DOCUMENT ENCRYPTION AND DECRYPTION PRINTING APPARATUS, METHOD, AND STORAGE MEDIUM

BACKGROUND OF THE INVENTION

1. Field of the Invention

The present invention generally relates to an information processing apparatus for processing document information.

2. Description of the Related Art

Recently, it has been the case that a large amount of documents are being distributed, so that security concerns about information leakage to a third person have become higher. Therefore, when documents including confidential information are to be displayed or printed by an information processing apparatus, a user generally builds a security system and manages information under a state in which the document can be protected.

However, an electronic document may also be comparatively easy to copy and alter. Thus, security measures can be provided in the electronic document itself.

For example, there is a system which encrypts an electronic document itself, and allows only a person having a secret key to decrypt and read the document, and a system which attaches a signature file to an electronic document and does not allow a person to view or print the document when the signature file is not identical.

However, if the entire electronic document is subjected to security measures, a user may need to edit or re-encrypt the electronic document if the user wants to protect only a part of the document and disclose the remainder of the document. Further, in the case where a signature file is attached, the signature may have to be re-attached if the document is edited, which may take time and effort.

Further, as printer performance is improved, a direct print system is increasingly being used, by which an electronic document is directly sent to a printer and printed as it is.

However, currently, there are few printers having the performance and specifications to handle a signature file and an encryption key system. Thus, many printers print out documents without regard to the functions of the signature file and the encryption key system provided in the document, so that confidential data may be leaked by output to a medium as a paper, even though the data is protected as the electronic document.

In terms of protecting confidential information, editing an electronic document itself may be the most effective. For example, Japanese Patent Application Laid-Open No. 2002-259363 describes a technique which extracts a confidential information part in a file and replaces the part with another character not existing in the file, e.g., an alphabet and an initial character.

However, when the confidential information part is replaced with the other character, the original data cannot be restored. Thus, Japanese Patent Application Laid-Open No. 2007-156861 describes a method which can restore a replaced document to an original document by generating a conversion table with a character to replace the document. This method may be capable of replacing only confidential information to be protected, and thus can easily disclose the non-confidential parts to public.

However, in this method, a manager may have to manage the conversion table. Thus, when there are a lot of confidential documents, a conversion table may be generated for each of the confidential documents, so that the management of the conversion tables may become complicated.

Further, if the same conversion table is used for each document in order to avoid the complicated management, it may occur that if one document is analyzed, the result may be inadvertently applied to every other document.

Further, when an electronic document is replaced with a character not existing in the document, every character in the entire document may have to be checked. Since it can be common for an electronic document to have several hundreds or thousands of pages, it may take an excessive amount of time to generate a conversion table. Furthermore, it can occur that the conversion table is not properly generated if almost all characters already exist in the electronic document.

SUMMARY OF THE INVENTION

According to an aspect of the present invention, an information processing apparatus which processes document information, the information processing apparatus includes a designation unit configured to designate information which is not to be displayed in the document information, a generation unit configured to generate identification information which is determined uniquely, an addition unit configured to add metadata for restoring the designated information from the identification information to the document information, and a replacing unit configured to replace the designated information in the document information with the identification information.

According to another aspect of the present invention, an information processing apparatus which processes document information, the information processing apparatus includes a determination unit configured to determine whether metadata exists in the document information when printing is requested, and a restoration unit configured to acquire identification information from the metadata when the determination unit determines that the metadata exists in the document information and restore the acquired identification information to corresponding information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain principles of the invention.

FIG. 6 illustrates an example of a structure of metadata used in an information processing apparatus according to an exemplary embodiment of the present invention.

FIG. 11 illustrates an example of a memory map of a storage medium which stores various kinds of data processing programs which can be read by an information processing apparatus according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
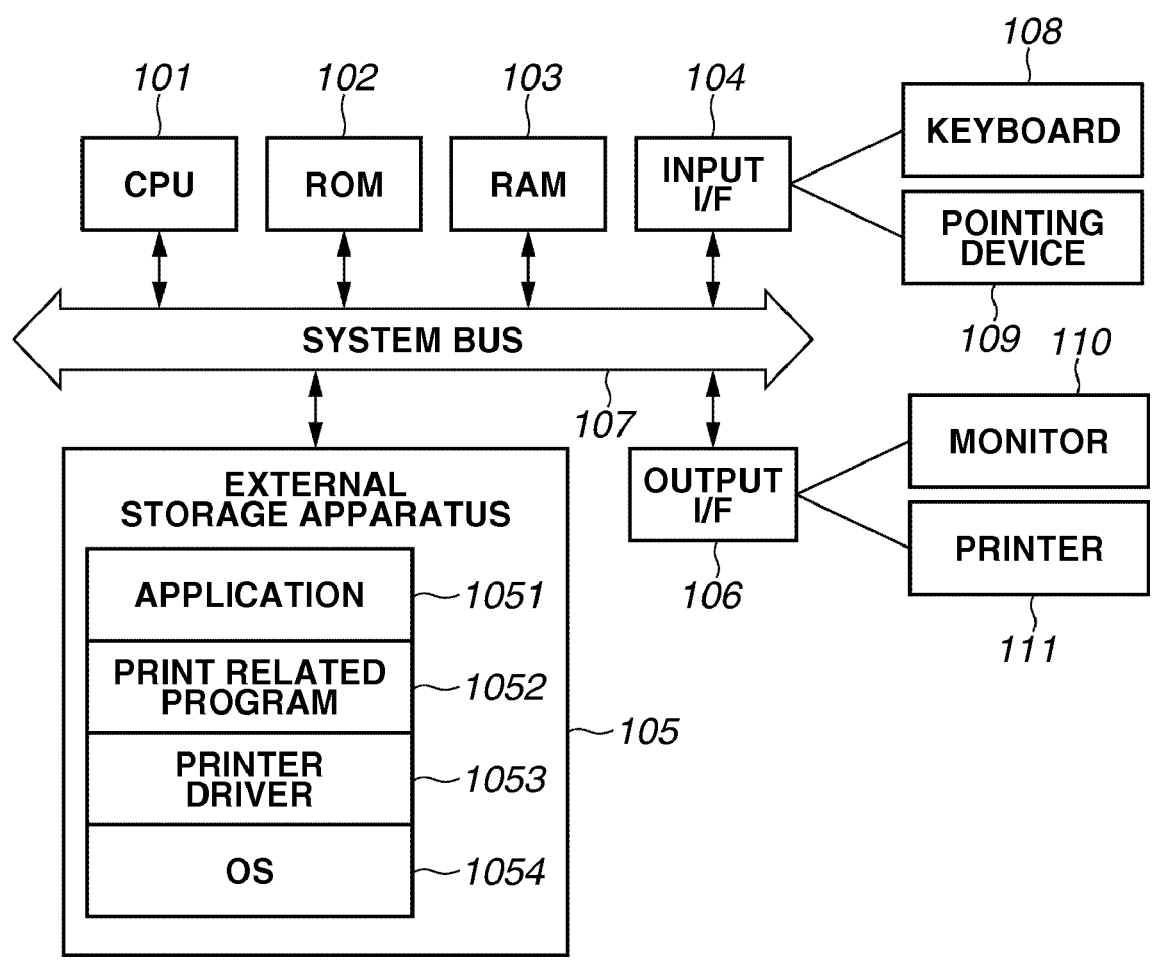
FIG. 1 is a block diagram illustrating a configuration of an information processing system according to an exemplary embodiment of the present invention.

FIG. 1 is a block diagram illustrating a configuration of an information processing system according to an exemplary embodiment of the present invention. Unless otherwise noted, aspects of the present invention can be applied to a simple function, a system including a plurality of devices, and a system connected and processed via networks such as local area network (LAN) and wide area network (WAN), as long as they can execute functions according to principles of the present invention. The system illustrated in FIG. 1 is a system example using a general computer.

In the example shown in FIG. 1, a central processing unit (CPU) 101 controls a whole apparatus according to a program stored in at least one of a read-only memory (ROM) 102, a random access memory (RAM) 103, and an external storage apparatus 105.

The CPU 101 may use the RAM 103 as a work area when executing various kinds of processing. The external storage apparatus may be configured with a non-volatile storage device such as hard disk. The external storage apparatus 105 as shown stores an operating system (OS) 1054, an application 1051, a print related program 1052 and a printer driver 1053.

A user may use input devices such as a keyboard 108 and a pointing device 109 to input various instructions to a computer via an input interface (I/F) 104.

An output interface (I/F) 106 outputs data to external devices, such as for example one or more of a monitor 110 and a printer 111. The output I/F 106 can be connected with the printer 111 via not only a local input/output (I/O) but also a network. A system bus 107 may serve as a common data bus and transmits and receives data among devices.

Figure 2:
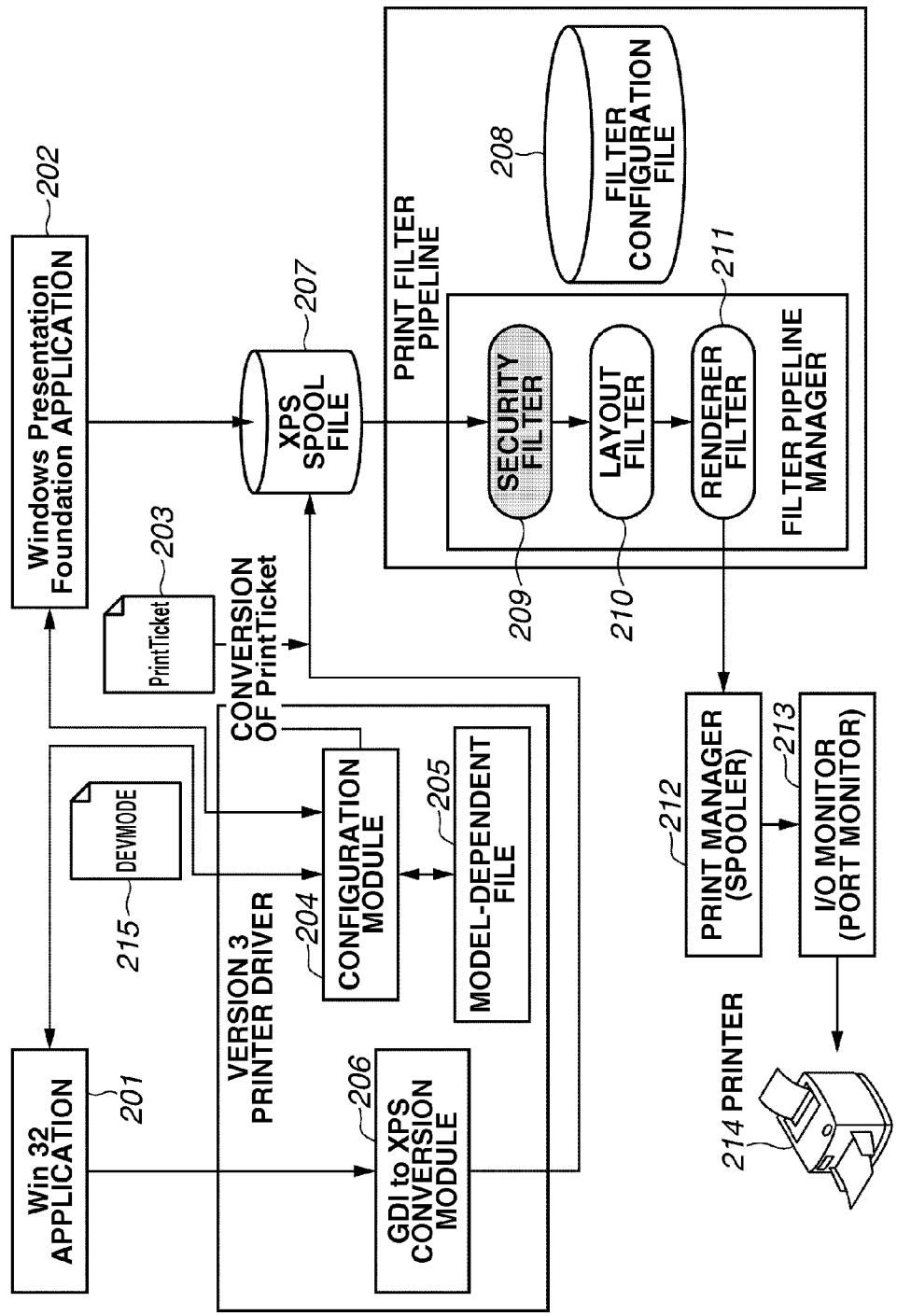
FIG. 2 a block diagram illustrating a configuration of an information processing system according to an exemplary embodiment of the present invention.

FIG. 2 is a block diagram illustrating a configuration of an information processing system according to the present exemplary embodiment. An example of XPSDrv print system is illustrated. According to this embodiment, the user uses the input device such as the keyboard 108 and the pointing device 109 and executes print processing using a Win32® application program 201 (hereinafter referred to as Win32® application) displayed on the monitor 110 of an output device or a Windows® (a registered trademark) Presentation Foundation application program 202 (hereinafter referred to as WPF application).

Print processing may be executed by three steps of selecting a printer, generating a print setting, and converting rendering data in order.

The user may select a printer 214 to be used for printing via a user interface displayed on the monitor 110. In other words, the user may select a printer driver corresponding to a printer which executes printing on the user interface displayed on the monitor 110 by operating the pointing device 109.

Then, the printer driver 1053 generates a print setting. In the print setting, the application 1051 allocates a memory for the print setting, and the application 1051 or a configuration module 204 of the printer driver 1053 may embed setting data in the memory using a model-dependent file 205.

For the print setting data, a binary development mode (DEVMODE) structure 215 may be used in the Win32® application 201, and a PrintTicket 203 described in an extensible markup language (XML) may be used in the WPF application 202. The application may directly rewrite and change the print setting stored in the DEVMODE structure 215 or the PrintTicket 203. The user may operate a displayed user interface of a printer driver of the configuration module 204 to set a dedicated print setting depending on the printer 214.

The printer driver 1053 may change the setting depending on the printer 214 of the DEVMODE structure 215 or the PrintTicket 203 according to settings of the user interface.

More specifically, the print setting may include, for example, one or more of setting an output paper size to "A4", setting double-sided printing, switching a color mode and a monochrome mode, and designating a paper feed stage. Further, since the PrintTicket 203 is described in the XML format, the application 1051 can easily and directly change every setting value. However, the setting value can also be changed using the user interface of the printer driver, for example as in a conventional technique.

Finally, the user may convert rendering data. When the print setting is determined, the user can execute the print processing from the application 1051. When printing is executed from the Win32® application 201, the rendering data may be transmitted to a graphic device interface (GDI) to XPS conversion module 206 having a form of a version 3 printer driver, and a XPS spool file 207 may be generated. At this time, the GDI to XPS conversion module 206 can call the configuration module 204 and converts the print setting from the DEVMODE structure 215 to the PrintTicket 203.

When printing is executed from the WPF application 202, there are two methods, i.e., a method by which the WPF application itself generates an XPS file, and a method by which the OS 1054 generates the XPS file in the WPF application 202 according to an instruction. Both methods can generate the XPS spool file 207.

As described above, the XPSDrv print system may be characterized by generating the XPS spool file 207 at the time of printing.

After generating the XPS spool file 207, the processing may be transferred to a print filter pipeline process. The print filter pipeline process can execute printing by passing the XPS spool file 207 through a plurality of filters, and a filter configuration file 208 controls a number and an order of the filters.

A filter pipeline manager which operates in the print filter pipeline process executes processing in a security filter 209, a layout filter 210, and a renderer filter 211 in this order in the present exemplary embodiment according to the filter configuration file 208.

The processing may be sequentially executed by each filter which processes and transfers the XPS spool file 207 to the next filter.

Finally, the processed XPS spool file may be output in a page description language (PDL) which is a data language understandable to the printer 214. If the printer 214 can directly read the XPS spool file 207, the XPS spool file 207 is transmitted to the printer 214 as it is. A function of each filter according to this embodiment will be described below.

The security filter 209 restores the XPS file which is subjected to security measures. The layout filter 210 executes processing relating to layout such as magnification change, an imposition layout of bookbinding, and a stamp layout.

Since the layout filter 210 can operate according to the PrintTicket 203 including the print setting in the XPS spool file 207, for example, when an imposition setting does not exist in the PrintTicket 203, the layout filter 210 may transmit the XPS spool file 207 to the next filter without processing.

The renderer filter 211 renders the XPS spool file 207 and converts the XPS spool file 207 to PDL data. Then, a print manager 212 for managing a schedule of print processing manages the converted PDL data, and registers printing jobs in a queue (a waiting string) one after another.

When the printer 214 is ready for printing, the print manager 212 may transmit the PDL data to the printer 214 via an I/O monitor 213, for example in order of registration in the queue.

Accordingly, the printer driver 1053 can convert print data transmitted from the application 1051 into a printer language, and an actual print processing can be executed.

Figure 3:
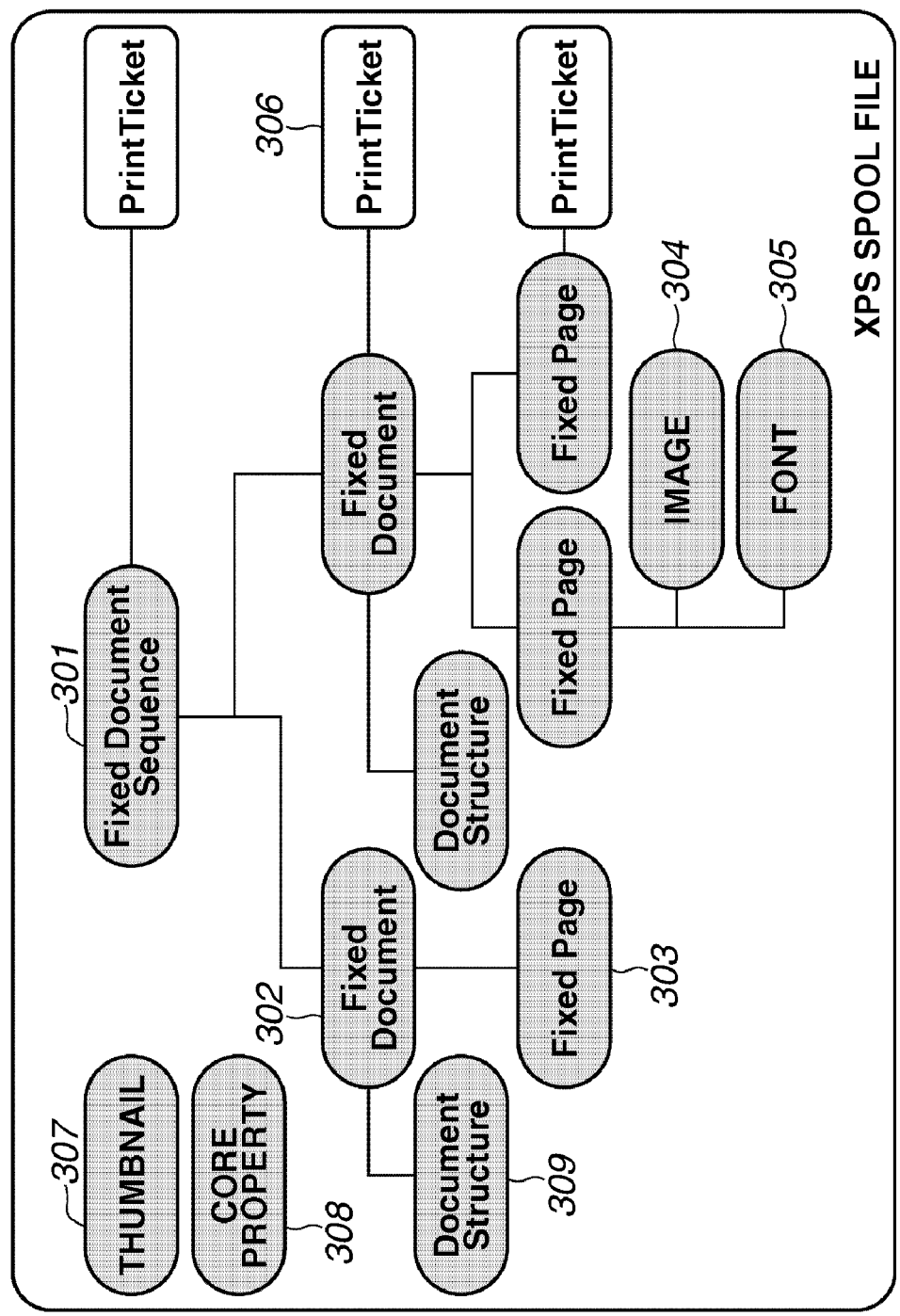
FIG. 3 illustrates an example of a structure of an extensible markup language paper specification (XPS) spool file illustrated in FIG. 2.

FIG. 3 illustrates an example of a structure of the XPS spool file 207 illustrated in FIG. 2 which has a three-layered structure according to the present exemplary embodiment.

In the example according to FIG. 3, the XPS spool file 207 has a structure integrating three-layered XML files. More specifically, the XPS spool file 207 has a fixed document sequence 301 (i.e., a job) in a first layer, a fixed document 302 (i.e., a document) in a next layer, and a fixed page 303 (i.e., a page) in an undermost layer.

Each layer is also referred to as a level. A page level includes each page of a document which becomes actual rendering data, and one document level includes a plurality of pages.

Further, since one XPS spool file 207 can include a plurality of documents, the job manages the plurality of documents. All documents may be described in XML and binary data such as resource data may be included in the XPS spool file 207 as it is, having a form such as an image 304 and a font 305.

A PrintTicket 306 including a print setting can be included in all levels of the job level, the document level, and the page level, and the print setting can be switched for every page.

Further, each function of the print setting in the PrintTicket 306 may indicate to which level the function is applied and may be defined by a prefix of a function name.

For example, when having "Job" as a prefix of the function, the PrintTicket 306 may have a function setting at the job level. The PrintTicket may indicate a function in a printer and a printer driver using an element of "Feature", and a choice of the function using an element of "Option". ScoredProperty and Property may be attribute information incidental to an Option, and ParameterInit may indicate a value of a function.

A thumbnail 307 is a snapshot image file of the first page, and the user can view the page using the image without rendering the page. Thus, the thumbnail 307 may be useful for displaying a list of a plurality of XPS spool files 207. A core property 308 may have property information of a document, and may include information about a document name, a revision, and an editor.

A document structure 309 may be information incidental to the document level and describes a page break between sections in a document. These pieces of the data may be compressed to one file as the XPS spool file 207. An XPS file in a document format may have the same structure as that of the XPS spool file 207.

An example of a method for rewriting the XPS file as an electronic document which is subjected to security measures, and an example of a method for restoring the XPS file to an original file and printing the restored file will be described below.

In the external storage apparatus 105, three applications, i.e., a confidential processing application, a document application for generating an electronic document, and an XPS viewer may be installed as the application 1051.

According to this example, the confidential processing application generates an XPS file which is subjected to security measures. The document application for generating an electronic document stores data edited by the user as the XPS file. The XPS viewer displays a layout of the XPS file when it is actually printed and is a Windows® presentation foundation application 202 capable of directly printing the XPS file.

The generated XPS file is stored in the external storage apparatus 105. Further, the generated XPS file can be restored by processing of the security filter 209 when the XPS file is printed by the XPS driver in the printer driver 1053.

Figure 4:
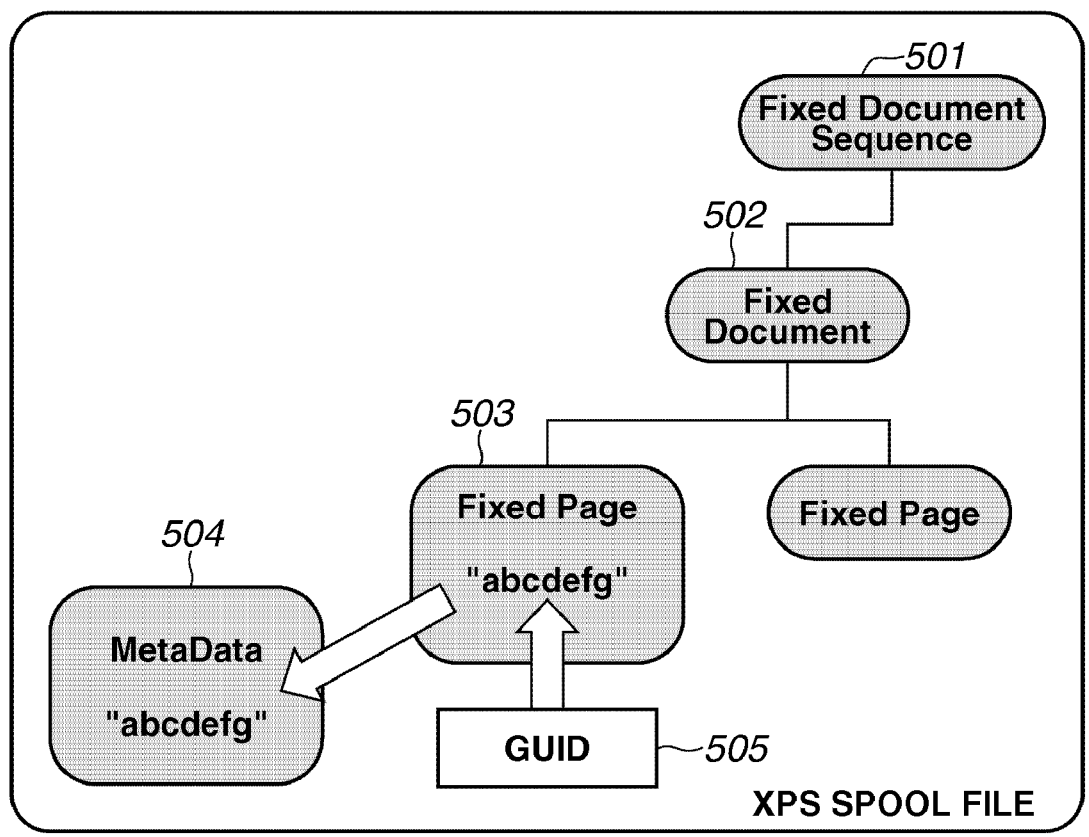
FIG. 4 illustrates an example of an XPS file in an information processing apparatus according to an exemplary embodiment of the present invention.

FIG. 4 illustrates an example of the XPS file in the information processing apparatus according to the present exemplary embodiment.

In the example shown in FIG. 4, the XPS spool file includes a fixed document sequence 501, a fixed document 502, and a fixed page 503 which correspond to the first layer to the third layer of the XPS file format respectively.

Metadata 504 may be generated by replacing a Glyph character in the fixed page 503 with a global unique identifier (GUID) 505.

In an output processing system having the above described configuration, the user may execute the application and generate a target electronic document XPS file. The electronic document XPS file may include confidential matters, e.g., a name, an address, and a telephone number, which are private information. For example, when a document including a name and an address, e.g., an official document such as a resident card and an identification card is created, the present exemplary embodiment can be applied to hide confidential information.

Further, as another example, when an examination paper with answers is generated, the present exemplary embodiment can be applied to hide only the answer parts of the paper. Furthermore, as yet another example, the present exemplary embodiment can be applied to hide an organization name or a personal name in a company organizational chart, confidential information such as values of a gross profit of sales, sales performance, and share, and a development project name and a code name.

Figure 7:
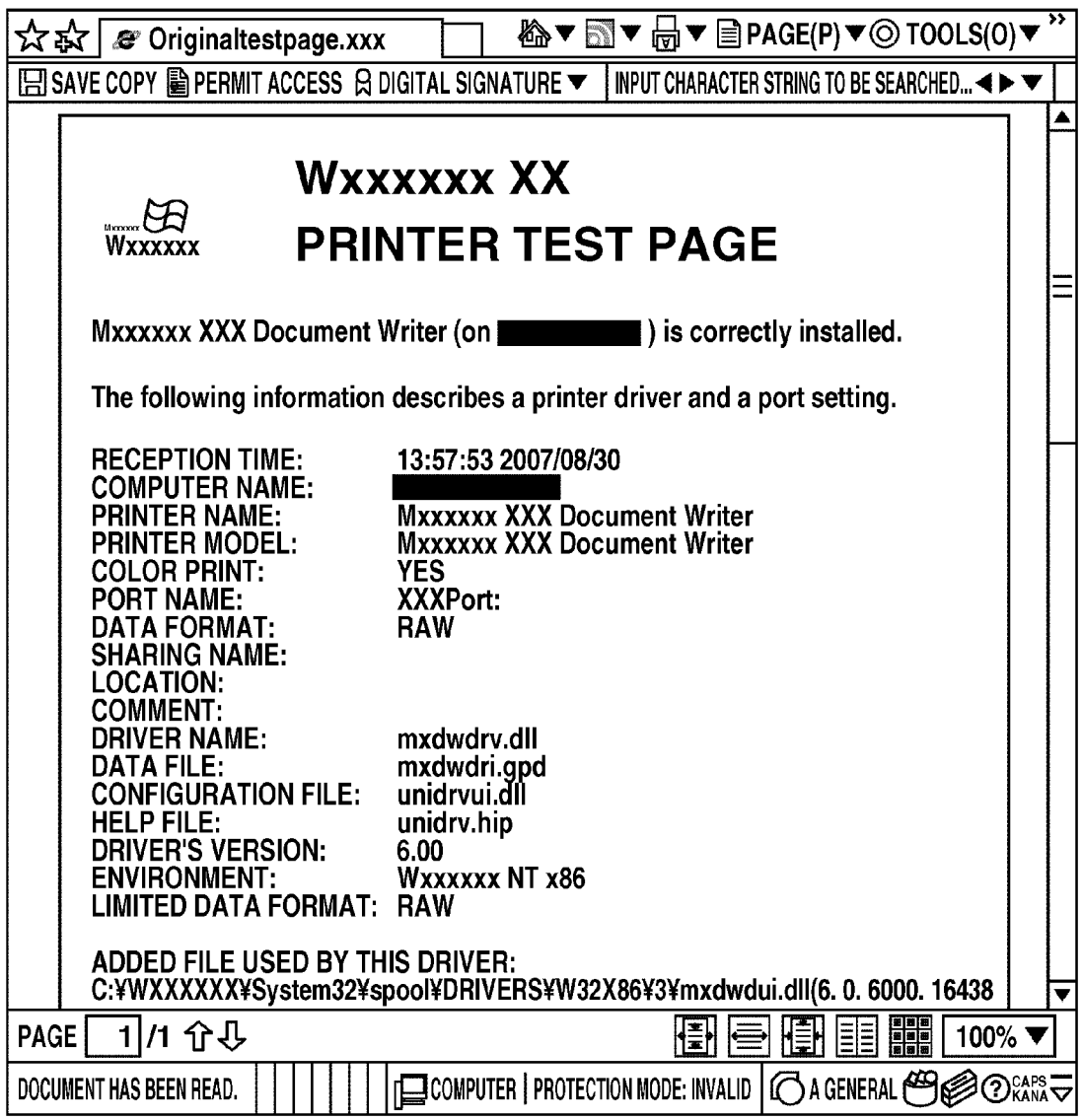
FIG. 7 illustrates a display example of an XPS document file processed in an output control apparatus according to an exemplary embodiment of the present invention.
Figure 8:
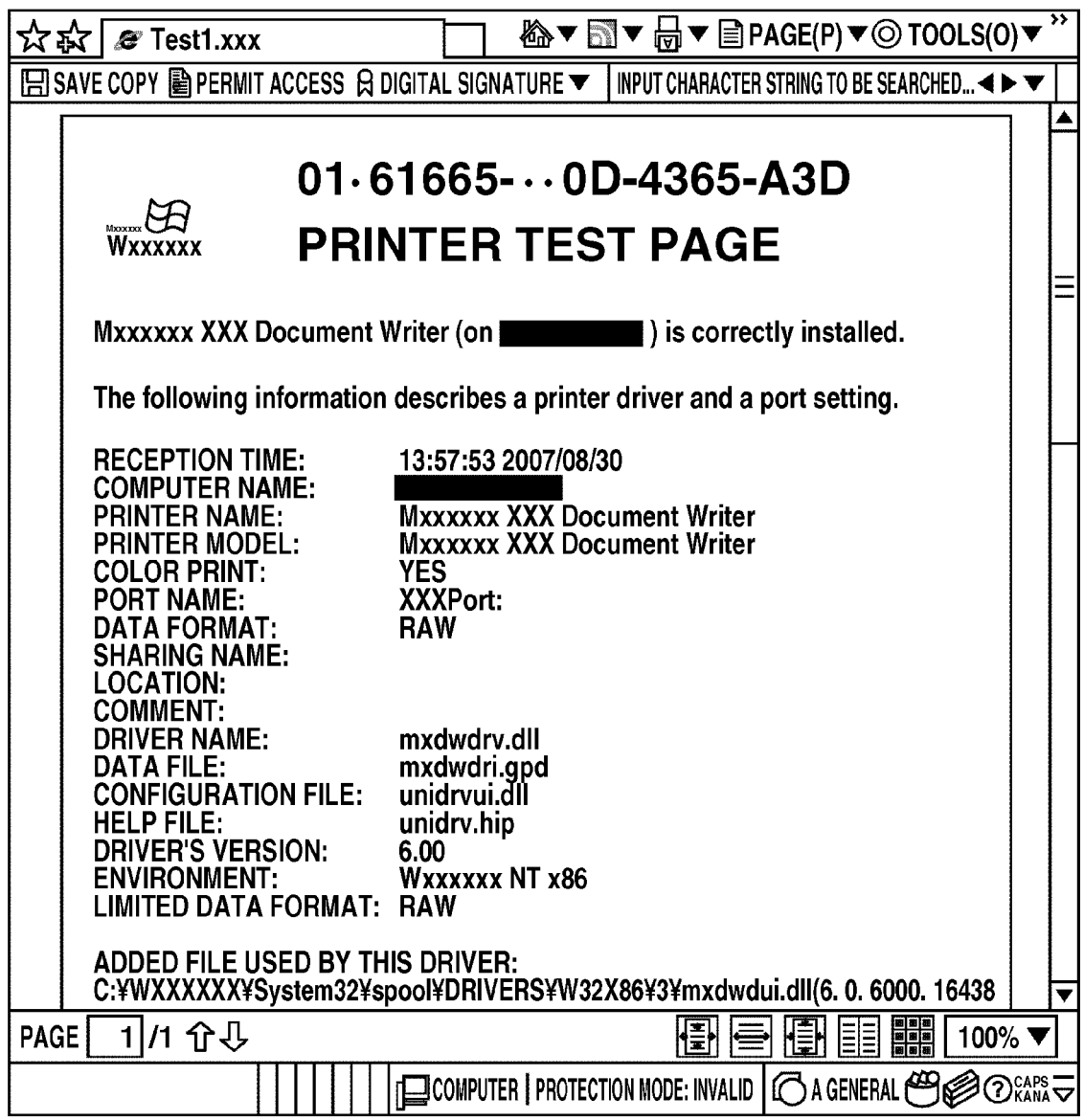
FIG. 8 illustrates a display example of an XPS document file processed in an output control apparatus according to an exemplary embodiment of the present invention.

An example of processing is described in the present exemplary embodiment by using a test page data of a printer driver as an electronic document XPS file as confidential target information. Characters, "Windows XP®", may be processed as illustrated in FIGS. 7 and 8. The electronic document XPS file may be generated by the user executing the application.

The user may open a target XPS file by a dedicated confidential processing application. The confidential processing application is capable of providing the security measures to the XPS file and includes a function for reading and previewing the XPS file in order to allow the user to easily designate a character string.

An example of a method for selecting a portion to be confidential and replacing a character string in the portion will be described below with reference to the flowchart of FIG. 5.

Figure 5:
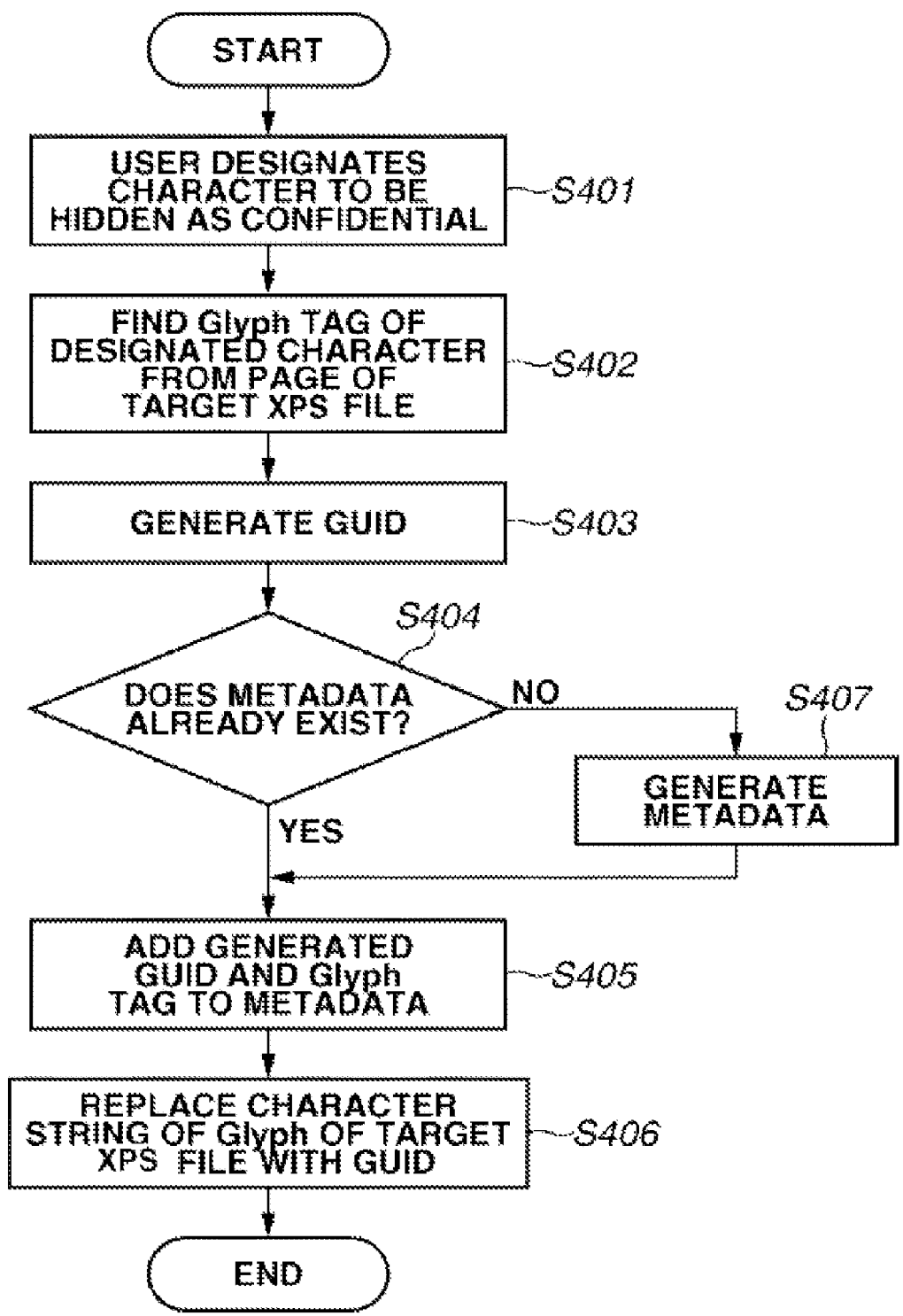
FIG. 5 is a flowchart illustrating an example of data processing procedure in an information processing apparatus according an exemplary embodiment of the present invention.

FIG. 5 is a flowchart illustrating an example of a data processing procedure, in which the portion to be confidential is selected and the character string in the portion is replaced, in the information processing apparatus according to the present exemplary embodiment. The CPU 101 may execute the application 1051 to realize each step.

In step S401, the confidential processing application previews the XPS file on the monitor 110 and the user designates a character of a selected confidential matter (i.e., designated information) by operating the pointing device 109. After designating the character of the confidential matter, the user pushes a button for starting the confidential processing and starts the confidential processing application. The user may also optionally designate a character by confirming whether a character that is automatically abstracted is designated as a confidential matter.

In step S402, as first processing, the confidential processing application searches the XML of a FixedPage in the target XPS file for the designated character according to a position and the character string selected by the user. In other words, the confidential processing application determines a target Glyph element. Since the character is described with a tag namely, the Glyph element in the XML of the FixedPage, the confidential processing application determines the Glyph element in which the designated character is described. In the Glyph element, the position of the character string and the character string data is described. The character string data may be described with either a Unicode string attribute as it is or an Indices attribute indicating a position of a designated font.

After determining the Glyph element by this way, in step S403, the confidential processing application generates a GUID as a universal unique identifier (UUID) having 128 bits (i.e., identification information). GUID is a kind of UUID, and can include pseudo random numbers used in software and binary identification information having 128 bits which are used as a uniquely determined identifier.

The confidential processing application may generate one GUID for every confidential target character, namely every Glyph tag, and manages the GUID and the confidential target character as a pair.

In step S404, the confidential processing application confirms whether the metadata 504 in FIG. 4 exists in the XPS file. The metadata is a XML file which is used for storing confidential data and may have a structure as illustrated in FIG. 6. The metadata may be stored as a separated character string file in the XPS file. The separated character string file can include designated and extracted information, i.e., at least one of a page number (a page position) corresponding to the character string, and a table of corresponding unique random character strings in the present exemplary embodiment.

When the confidential processing application determines that the metadata does not exist in the XPS file (NO in step S404), in step S407, the confidential processing application generates new metadata in the XPS file. Then, processing proceeds to step S405.

In contrast, when the confidential processing application determines that the metadata exists in the XPS file (YES in step S404), the confidential processing application adds a new element to the metadata. The metadata may be capable of managing one character string and one GUID with the element of GlyphData respectively and may be configured so as to manage a plurality of pairs of the confidential character strings and the GUID with one piece of the metadata.

In the GlyphData element, a uniform resource identifier (URI) including a confidential target character string, i.e., a file name, may be described. Further, the GUID may be described by a Pseudo element, and the Glyph of the confidential target character string in the GUID may be described in a form which is described in the FixedPage.

In step S405, the confidential processing application adds the generated GUID and a target Glyph in the metadata in the XPS file. By this process, the confidential processing application can manage the confidential target character string and the GUID as one pair. After adding the GUID and the Glyph to the metadata in the XPS file, the confidential processing application embeds the metadata into the target XPS file.

When adding to the metadata is finished, in step S406, the confidential processing application replaces the confidential target character string in the target XPS file with the GUID, and then ends the processing.

More specifically, the confidential processing application rewrites the Unicode string attribute in the Glyph element with the generated GUID. If the Glyph does not include the Unicode string attribute, the confidential processing application newly adds the Unicode string attribute and describes a character of the GUID.

By this process, characters "abcdefg" in the XPS file in FIG. 4 may be rewritten. In the present exemplary embodiment, the rewritten XPS file is referred to as a security XPS file.

The security XPS file can be displayed using a viewer capable of displaying a general XPS file. An XPS viewer for displaying a general XPS file skips (i.e., cannot interpret) the metadata as unknown data. That is, the metadata may be metadata which is skipped by a general viewer, such as an XPS viewer.

FIGS. 7 and 8 illustrate display examples of a XPS document file which is processed by an output control apparatus according to the present exemplary embodiment. In this example, the XPS document file is displayed by the XPS viewer. FIG. 7 illustrates a display example of an original XPS file before providing security measures, and FIG. 8 illustrates a display example of the XPS file after providing the security measures.

In the present exemplary embodiment, the XPS file before rewritten is displayed as illustrated in the example shown in FIG. 7, and a target character string in the rewritten XPS file is displayed with the GUID as illustrated in the example shown in FIG. 8.

Here, the target character string is not displayed with a normal GUID character since embedded font data in the XPS file for displaying characters does not correspond to every newly added GUID character.

Accordingly, the viewer for displaying the XPS file does not display the characters as being confidential.

Next, a method for restoring the confidential character in the security XPS file and printing it will be described with reference to FIGS. 9 and 10.

Figure 9:
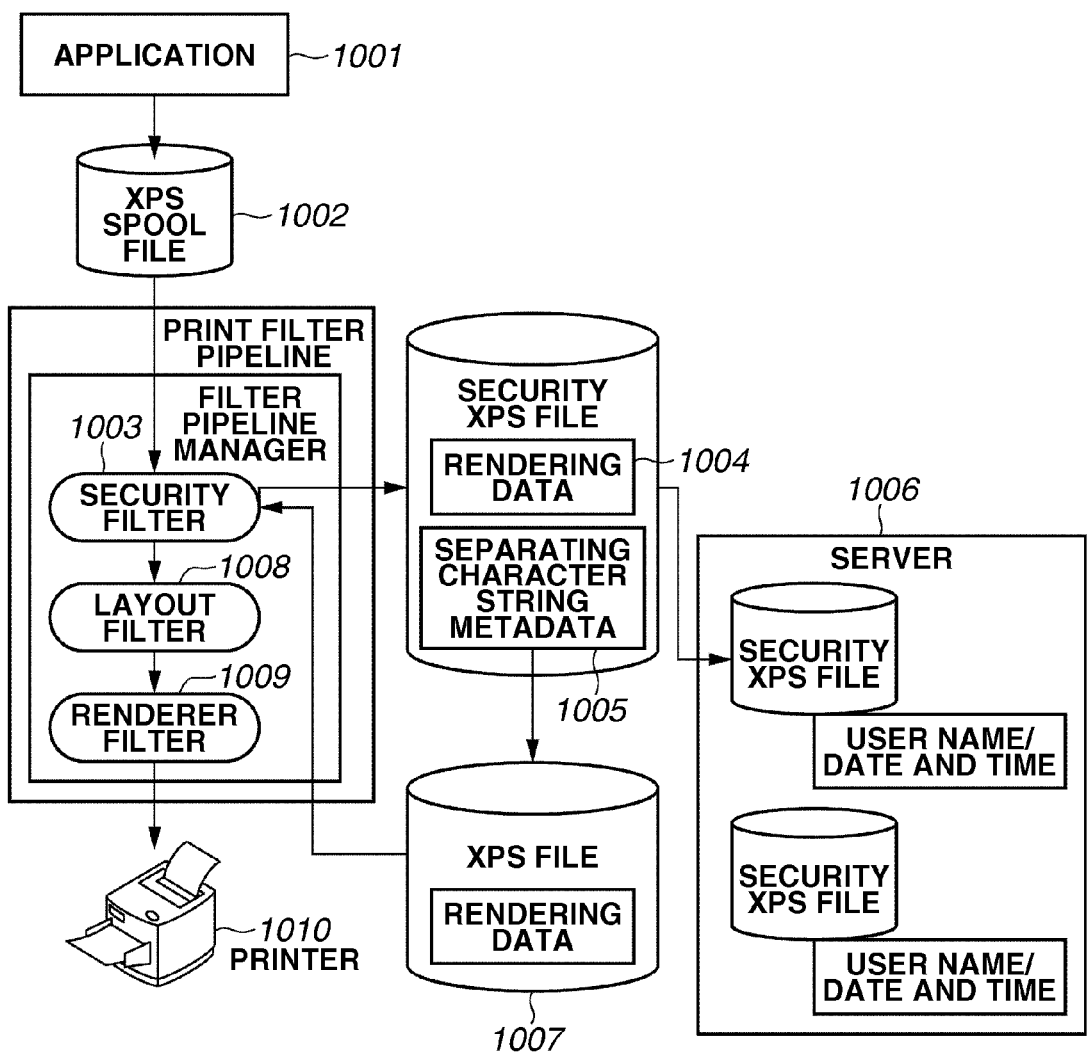
FIG. 9 is a block diagram illustrating a configuration of an information processing system which is applied to an information processing apparatus according to an exemplary embodiment of the present invention.

FIG. 9 is a block diagram for describing a configuration of the information processing system which may be applied to the information processing apparatus according to the present exemplary embodiment.

In FIG. 9, an application 1001 for directly printing the security XPS file may start printing. The security XPS file may be capable of becoming an XPS spool file 1002 as it is and may be transmitted to a print filter pipeline. The print filter pipeline can transmit the XPS spool file 1002 to a security filter 1003 at first. In the present exemplary embodiment, the security XPS file includes rendering data 1004 and separated character string metadata 1005. The separated character string metadata 1005 may have a data structure illustrated in FIG. 6, and may include identification information generated by processing as illustrated in the example of FIG. 5 and information corresponding to the identification information.

Figure 10:
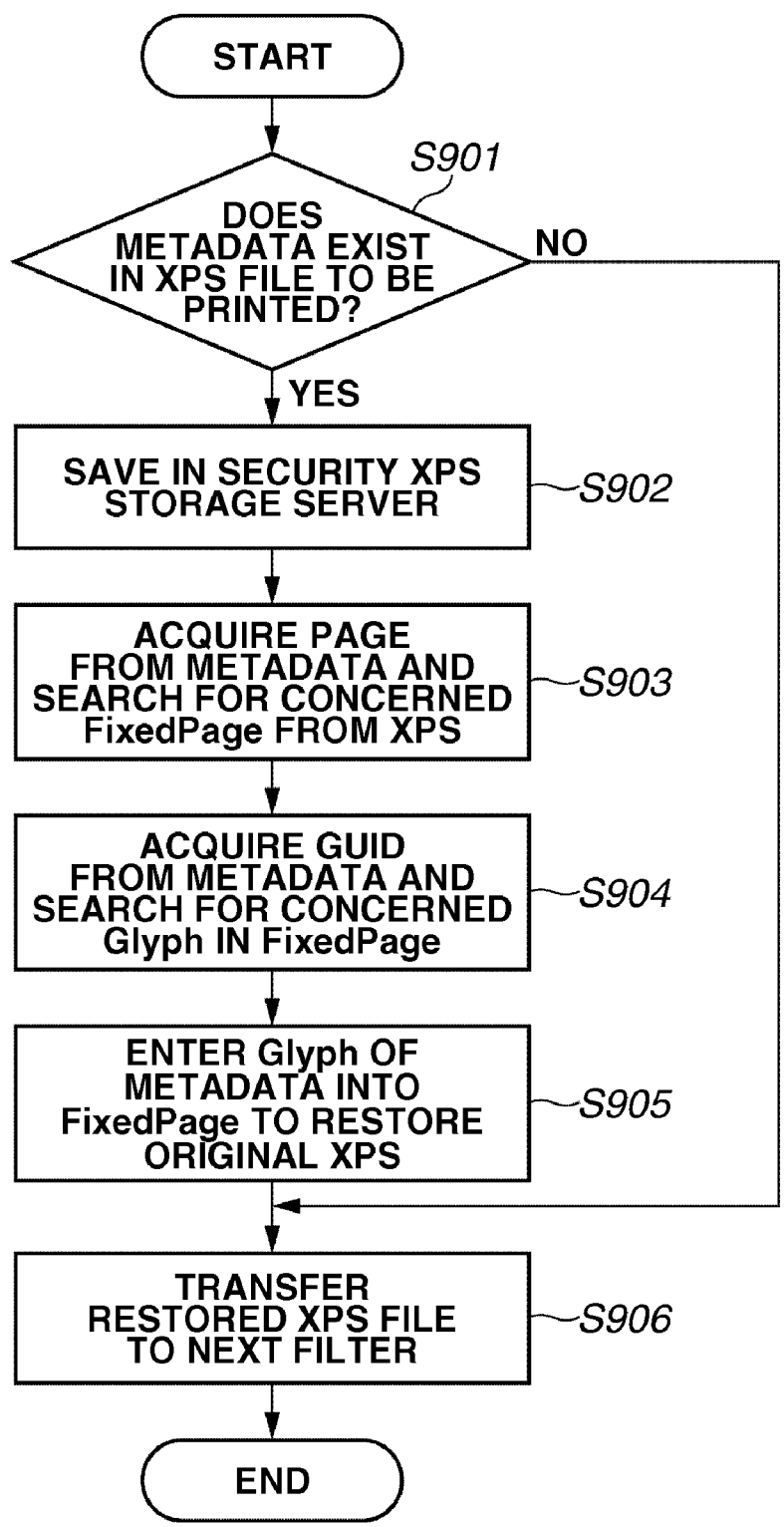
FIG. 10 is a flowchart illustrating an example of a data processing procedure in an information processing apparatus according to an exemplary embodiment of the present invention.

An example of an operation of the security filter 1003 will be described with reference to the flowchart in FIG. 10. The security filter 1003 can include a metadata generation function for generating metadata and may generate rendering data and separated character string metadata as follows:

FIG. 10 is a flowchart for illustrating an example of a data processing procedure by a filter pipeline manager in the information processing apparatus according to the present exemplary embodiment. Each step may be realized by the CPU 101 executing the print filter pipeline using a dedicated printer when an application executed by the user requests printing.

In step S901, the security filter 1003 confirms whether the metadata exists in the transmitted XPS spool file 1002. The metadata may be generated, for example, by the processing illustrated in FIG. 4.

When the security filter 1003 determines that the metadata does not exist in the XPS spool file 1002 (NO in step S901), the security filter 1003 transfers the XPS spool file 1002 without changing any matters and the processing proceeds to step S906. In step S906, the security filter 1003 transfers the XPS data to the next filter and ends the processing. The data processing will be described below with reference to the metadata illustrated in FIG. 6.

If the security filter 1003 determines that the metadata exists in the XPS spool file 1002 (YES in step S901), the security filter 1003 accesses a security XPS file storage server 1006. The security XPS file may be configured by integrating the rendering data 1004 and information designated by the user in document information, namely the metadata (i.e., the separated character string data) in which the character string is separated and replaced with the GUID in the present exemplary embodiment. That is, the security XPS file may have a configuration where the rendering data 1004 and the separated character string metadata 1005 are stored in a same file.

When the security filter 1003 can access the security XPS file storage server 1006 which stores the security XPS file, in step S902, the security filter 1003 transmits and stores the received XPS spool file 1002 in the security XPS file storage server 1006.

At this time, the security filter 1003 may store a name of the user who instructs the printing and date and time of printing. By this process, a backup file of the security XPS file and a converted history thereof can be stored in the security XPS file storage server 1006.

Then, the security filter 1003 starts restoration processing of the security XPS file, and processes the GlyphData elements in the metadata one by one. The security filter 1003 acquires a file name of the FixedPage in which the replaced character string exists from a Page attribute of the GlyphData element.

In step S903, when the file name is acquired, the security filter 1003 searches for the FixedPage in the XPS spool file 1002 by the file name.

Then, in step S904, the security filter 1003 acquires the character string of the GUID (i.e., identification information) from the Pseudo element of the metadata, as illustrated for example in FIG. 6. The security filter 1003 enumerates the Glyph elements in the FixedPage found in step S903, and searches the Unicode string attribute in the metadata, for example as illustrated in FIG. 6, to detect whether the same GUID character string exists therein. Since the GUID character string is a unique identifier, the security filter 1003 does not search data which is not a character incorrectly replaced or other replaced GUID.

When the security filter 1003 finds the GUID corresponding to the FixedPage, in step S905, the security filter 1003 replaces the Glyph element of the FixedPage with the Glyph element (Windows XP®) in the metadata (i.e., the corresponding information), as illustrated for example in FIG. 6. In this manner, the GUID is restored in a state of being replaced with Windows XP®.

The security filter 1003 executes the above described processing to every Glyph element in the metadata and restores in a state of an original XPS file 1007. When restoration is completed, in step S906, the security filter 1003 transfers the XPS spool file 1007 to the next filter and ends processing.

Then, a layout filter 1008 and a renderer filter 1009, which are the next filters of the security filter 1003, can process and finally output the XPS spool file 1002 to a printer 1010.

As described above, when the user executes printing using a dedicated printer driver in which a security filter exists, the security XPS file can be restored and printed including the confidential information. Of course, when a printer driver in which a security filter does not exist is used, the confidential information is printed in the GUID characters, and thus the confidential information is protected.

Aspects according to the exemplary embodiment provide a method capable of correctly printing information in a restored state when a print request is made by referring to information stored in a document, although the information may be converted and not correctly displayed in general display processing for security reasons.

Further, when a file is restored, the security XPS file storage server 1006 saves the history. Thus, a file which is printed with the confidential information can be specified.

When the GUID characters are displayed as is, a layout of the characters may collapse as illustrated in FIG. 8. Thus, when the GUID character is added, an Opacity attribute of the Glyph may be set to "0" to set all characters transparent, so that the GUID character is not displayed and the layout does not collapse.

When the restoration processing is not always necessary, JobRestructSecurityXPS, one of the features of the PrintTicket which is a print setting of a security XPS file, can be used. When the user turns ON the JobRestructSecurityXPS, the security filter can execute the restoration processing.

When the user turns OFF the JobRestructSecurityXPS, the security filter does not execute the restoration processing. That is, the security filter passes the security XPS file without checking the metadata thereof.

In the present exemplary embodiment, a user designates information not to be displayed. However, the information processing apparatus can be configured to include an information table for specifying information which is previously determined not to be displayed, compare the information registered in the information table, and automatically determine information not to be displayed.

A configuration of a data processing program which can be read by the information processing apparatus according to the exemplary embodiment of the present invention will be described below with reference to an example of a memory map as illustrated in FIG. 11.

FIG. 11 illustrates an example of a memory map of a storage medium which stores various data processing programs which can be read by the information processing apparatus according to the exemplary embodiment of the present invention.

The information processing apparatus can store information for managing a program group stored in the storage medium, e.g., one or more of version information and a creator thereof, and information depending on an OS on the program reading side, e.g., an icon for identifying and displaying the program, although these pieces of the information are not illustrated.

Dependent data of the various programs may be managed in a directory of the above described storage medium. Further, a program for installing various programs into a computer and a program for decompressing a compressed program to be installed can be stored in the storage medium.

A host computer can execute the functions illustrated in FIGS. 5 and 10 in the present exemplary embodiment using an externally installed program. In such a case, aspects of the present invention can be applied to a case where an information group including, e.g., at least one of a program and computer-executable instructions, is supplied to the output device from the storage medium, such as at least one of a compact disc reading only memory (CD-ROM), a flash memory, and a floppy disk (FD), and from an external storage medium via the network.

Aspects of the present invention can be achieved by supplying the storage medium, which stores a program code of software and/or computer-executable instructions to realize the functions of the above described exemplary embodiment to a system or a device, and by reading and executing the program code and/or computer-executable instructions stored in the storage medium by a computer (or a central processing unit (CPU) or a micro processing unit (MPU)) of the system or the device.

In this case, the program code and/or computer-executable instructions itself which is read out from the storage medium, realizes a new function according to aspects of the present invention, so that the storage mediums storing the program code and/or computer-executable instructions may constitute aspects according to the present invention.

Therefore, any program and/or computer-executable instructions, e.g., an object code, a program executed by an interpreter, and script data supplied to an OS, can be used, for example if it includes a function of the program.

As for the storage medium for supplying the program and/or computer-executable instructions, at least one of a floppy disk, a hard disk, an optical disk, a magneto-optical disk (MO), a CD-ROM, a CD recordable (CD-R), a CD rewritable (CD-RW), a magnetic tape, a non-volatile memory, a ROM, and a digital versatile disc (DVD), can be used.

In this case, the program code and/or computer-executable instructions read out from the storage medium itself may realize functions according to the present exemplary embodiment, and the storage medium storing the program code and/or computer-executable instructions may constitute an embodiment according to the present invention.

As for another supply method, the program and/or computer-executable instructions can also be supplied by connecting with a web site of the internet using a browser of a client computer, and downloading the computer program and/or instructions or a compressed file including an automatic install function of the present exemplary embodiment from the web site to the storage medium such as a hard disk. Further, aspects of the present invention can be realized by dividing the program code and/or computer-executable instructions of the exemplary embodiment of the present invention into a plurality of files, and downloading these files from different web sites. That is, embodiments of the present invention includes a WWW server and a file transfer protocol (ftp) server which allow a user to download the plurality of files which realize the function processing according to aspects of the present invention by a computer.

Further, the program and/or computer-executable instructions according to an exemplary embodiment of the present invention can be encrypted, stored in the storage medium such as CD-ROM, and delivered to a user. If a user satisfies predetermined conditions, the user can download key information for decrypting the program and/or computer-executable instructions from a web site via the Internet. Then, the user can install the encrypted program and/or computer-executable instructions using key information to the computer and execute the decrypted program and/or computer-executable instructions.

Further, the functions of the exemplary embodiment can be achieved not only by executing the program and/or computer-executable instructions read by a computer. For example, an OS running on a computer can perform a part or whole of actual processing based on the instruction and implement the functions according to the present invention.

Furthermore, the program code and/or computer-executable instructions read from the storage medium may be written in a memory of a function expansion board inserted into a computer or a function expansion unit connected the computer. Then, a CPU of the function expansion board or the function expansion unit may execute a part or whole of the actual processing based on the instruction of the program code and/or computer-executable instructions, so that functions according to embodiments of the invention can be implemented.

According to an exemplary embodiment of the present invention, by referring to information stored in a document, the information which cannot be correctly displayed in a general display processing since the information is replaced for security purposes can be correctly printed as a document in a restored state when printing is requested.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-097241 filed Apr. 3, 2008, which is hereby incorporated by reference herein in its entirety.

What is claimed is:

1. An information processing apparatus comprising:
a memory configured to store a program for executing the steps of:
designating a character string to be hidden in a document;
generating a unique and random character string;
adding the generated unique and random character string and the designated character string to be hidden in the document to metadata of the document; and
replacing the designated character string to be hidden in the document with the generated unique and random character string, and
a processor configured to execute the program stored in the memory,
wherein, in a case where the document is output by a first program that cannot interpret the metadata, the metadata is skipped and the character string to be hidden in the document is output with the unique and random character string with which the designated character string to be hidden in the document is replaced, wherein, in a case where the document is output by a second program that can interpret the metadata, the metadata is interpreted and the character string to be hidden in the document is output with the designated character string, wherein, in the adding step, the unique and random character string generated by setting an attribute of the generated unique and random character string transparent is added, and wherein, in a case where the document is displayed by the first program, the metadata is skipped and the character string to be hidden in the document is not output with the unique and random character string with which the designated character string to be hidden in the document is replaced.

2. A method for processing document information comprising:

using a processor to perform the following:
designating a character string to be hidden in a document;
generating a unique and random character string;
adding the generated unique and random character string and the designated character string to be hidden in the document to metadata of the document; and
replacing the designated character string to be hidden in the document with the generated unique and random character string,
wherein, in a case where the document is output by a first program that cannot interpret the metadata, the metadata is skipped and the character string to be hidden in the document is output with the unique and random character string with which the designated character string to be hidden in the document is replaced,
wherein, in a case where the document is output by a second program that can interpret the metadata, the metadata is interpreted and the character string to be hidden in the document is output with the designated character string,
wherein the unique and random character string generated by setting an attribute of the generated unique and random character string transparent is added, and
wherein, in a case where the document is displayed by the first program, the metadata is skipped and the character string to be hidden in the document is not output with the unique and random character string with which the designated character string to be hidden in the document is replaced.

3. A non-transitory storage medium having computer-executable instructions stored thereon for causing a computer to execute a method for processing document information, the method comprising:
designating a character string to be hidden in a document;
generating a unique and random character string;
adding the generated unique and random character string and the designated character string to be hidden in the document to metadata of the document; and
replacing the designated character string to be hidden in the document with the generated unique and random character string,
wherein, in a case where the document is output by a first program that cannot interpret the metadata, the metadata is skipped and the character string to be hidden in the document is output with the unique and random character string with which the designated character string to be hidden in the document is replaced,
wherein, in a case where the document is output by a second program that can interpret the metadata, the metadata is interpreted and the character string to be hidden in the document is output with the designated character string,
wherein the unique and random character string generated by setting an attribute of the generated unique and random character string transparent is added, and
wherein, in a case where the document is displayed by the first program, the metadata is skipped and the character string to be hidden in the document is not output with the unique and random character string with which the designated character string to be hidden in the document is replaced.

4. An information processing apparatus comprising:
a memory configured to store a program for executing the steps of:
designating a character string to be hidden in a document;
generating a unique and random character string;
adding the generated unique and random character string and the designated character string to be hidden in the document to metadata of the document; and
replacing the designated character string to be hidden in the document with the generated unique and random character string, and
a processor configured to execute the program stored in the memory,
wherein, in a case where the document is output by a first program that cannot interpret the metadata, the metadata is skipped and the character string to be hidden in the document is output with the unique and random character string with which the designated character string to be hidden in the document is replaced,
wherein, in a case where the document is output by a second program that can interpret the metadata, the metadata is interpreted and the character string to be hidden in the document is output with the designated character string,
wherein the document includes an XPS file,
wherein, in the adding step, the generated unique and random character string, the designated character string to be hidden in the document and a page number corresponding to the designated character string to be hidden in the document are added to metadata of the XPS file, and
wherein, in the replacing step, a Glyph element of a FixedPage of the XPS file is replaced with the generated unique and random character string.

5. A method for processing document information comprising:
using a processor to perform the following:
designating a character string to be hidden in a document;
generating a unique and random character string;
adding the generated unique and random character string and the designated character string to be hidden in the document to metadata of the document; and
replacing the designated character string to be hidden in the document with the generated unique and random character string,
wherein, in a case where the document is output by a first program that cannot interpret the metadata, the metadata is skipped and the character string to be hidden in the document is output with the unique and random character string with which the designated character string to be hidden in the document is replaced, wherein, in a case where the document is output by a second program that can interpret the metadata, the metadata is interpreted and the character string to be hidden in the document is output with the designated character string, wherein the document includes an XPS file, wherein the generated unique and random character string, the designated character string to be hidden in the document and a page number corresponding to the designated character string to be hidden in the document are added to the metadata of the XPS file, and wherein a Glyph element of a FixedPage of the XPS file is replaced with the generated unique and random character string.

6. A non-transitory storage medium having computer-executable instructions stored thereon for causing a computer to execute a method for processing document information, the method comprising:

designating a character string to be hidden in a document;

generating a unique and random character string;

adding the generated unique and random character string and the designated character string to be hidden in the document to metadata of the document; and replacing the designated character string to be hidden in the document with the generated unique and random character string, wherein, in a case where the document is output by a first program that cannot interpret the metadata, the metadata is skipped and the character string to be hidden in the document is output with the unique and random character string with which the designated character string to be hidden in the document is replaced, wherein, in a case where the document is output by a second program that can interpret the metadata, the metadata is interpreted and the character string to be hidden in the document is output with the designated character string, wherein the document includes an XPS file, wherein the generated unique and random character string, the designated character string to be hidden in the document and a page number corresponding to the designated character string to be hidden in the document are added to the metadata of the XPS file, and wherein a Glyph element of a FixedPage of the XPS file is replaced with the generated unique and random character string.

* * * * *